J. G. Fuller.
Pulp Engine.
No. 46,893. Patented Mar. 21, 1865.

Witnesses
Thos. Geo. Harold
Chas. H. Smith

Inventor;
Joseph G. Fuller

UNITED STATES PATENT OFFICE.

JOSEPH G. FULLER, OF BROOKLYN, NEW YORK.

IMPROVEMENT IN ENGINE FOR PREPARING PAPER-STOCK.

Specification forming part of Letters Patent No. 46,893, dated March 21, 1865.

*To all whom it may concern:*

Be it known that I, JOSEPH G. FULLER, of Brooklyn, in the county of Kings and State of New York, have invented, made, and applied to use a certain new and useful Improvement in Means for Preparing Paper-Stock; and I do hereby declare the following to be a full, clear, and exact description of my said invention, reference being had to the annexed drawings, making part of this specification, wherein—

Figure 1:
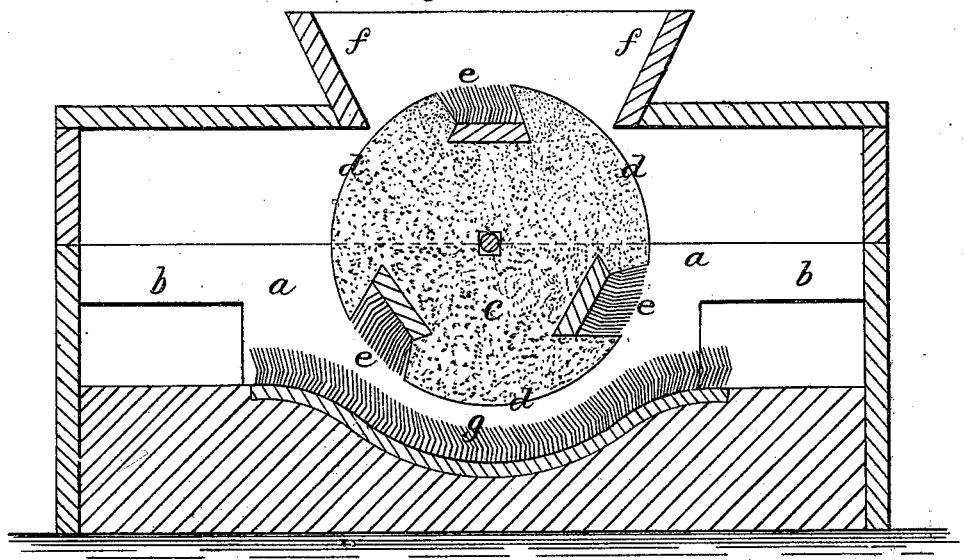
Figure 2:
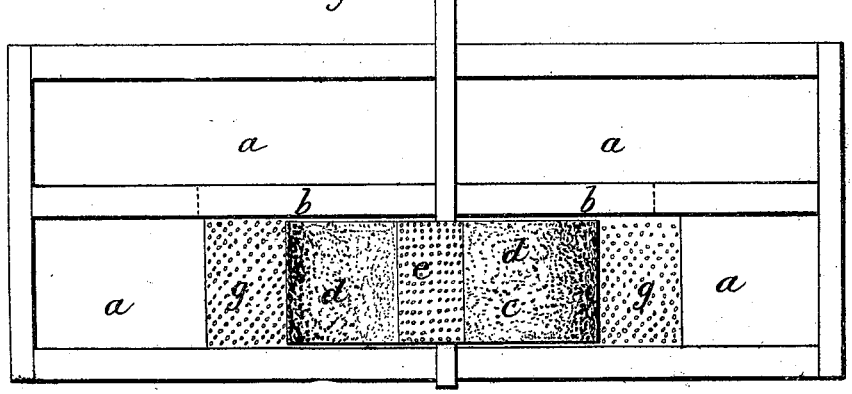

Figure 1 is a vertical section of my apparatus for preparing paper-stock, and Fig. 2 is a plan of the same with the upper part of the case removed.

Similar marks of reference denote the same parts.

My apparatus is especially adapted to the preparation of paper-stock from sea weeds and grasses that require an abrading and rubbing operation in connection with a tearing or shredding device, so that the fibers will not be cut apart, but rubbed and torn. Thereby the portions that are not fibrous will be reduced to a condition in which they can be washed away, while the fibers themselves are separated and reduced to a sufficient fineness to be adapted to the usual pulping-engine at paper-mills.

The nature of my said invention consists in a revolving wheel composed of ranges of teeth alternating with a rough or abrading surface, that draw the fiber from a hopper, tear up and rub the same, and also bring the fiber down into a washing-vat, in which is a concave range of teeth that act to tear apart any fibers that are sufficiently long to reach from the said stationary concave range of teeth to the revolving teeth.

In the drawings, $a$ is a vat with a central division, $b$, in the ends of which are openings, so that the water and fiber can be circulated, as in a pulping-engine, by the action of the wheel $c$, placed between the division $b$ and one of the sides of the vat. This wheel $c$ is on a shaft suitably sustained and revolved by competent power.

$d\ d$ are sections around the periphery of such wheel $c$, formed with rough or abrading surfaces. I prefer that these should be pieces of gritty or porous stone, but the same may be of emery or sand suitably compounded and attached.

$e\ e$ are sections intermediate to the sections $d\ d$ and composed of ranges of teeth. I prefer wire or card teeth that are of sufficient size and strength.

$f$ is a hopper, into which the sea-weed or other similar vegetable material is to be placed and drawn down into the vat $a$ in shreds by the teeth $e\ e$, and at the same time the fibers are rubbed by the sections $d\ d$ for the removal of foreign and non-fibrous matter.

$g$ is a concave of teeth in the bottom of the vat $a$, between which and the wheel $c$ the fibrous material suspended in water is constantly passed by the action of said wheel and reduced to a greater or less degree of fineness, according to the distance between $g$ and $c$, which distance may be varied by adjusting said wheel $c$.

I prefer that the material placed in the hopper should have been thoroughly softened by steeping in water, and a stream of water may run into said hopper.

What I claim, and desire to secure by Letters Patent, is—

A revolving wheel composed of teeth in sections, with intermediate sections of stone or other rough material, in combination with a hopper containing the vegetable material to be operated on, as set forth; and in combination with said revolving-wheel of alternate teeth and roughened surfaces, the stationary concave of teeth in the trough $a$, as and for the purposes specified.

I witness whereof I have hereunto set my signature this 6th day of December, 1864.

JOSEPH G. FULLER.

Witnesses:
 THOS. GEO. HAROLD,
 CHAS. H. SMITH.